No. 823,170. PATENTED JUNE 12, 1906.
A. HIRSCH.
UNIVERSAL PELT STRETCHER.
APPLICATION FILED FEB. 27, 1906.
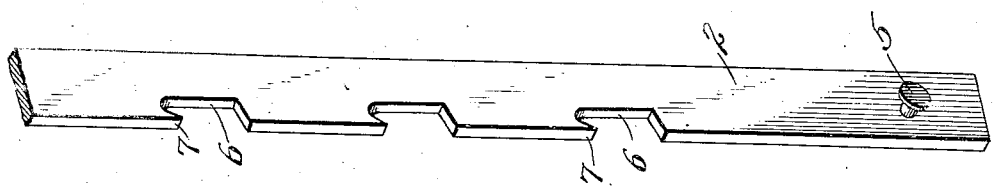
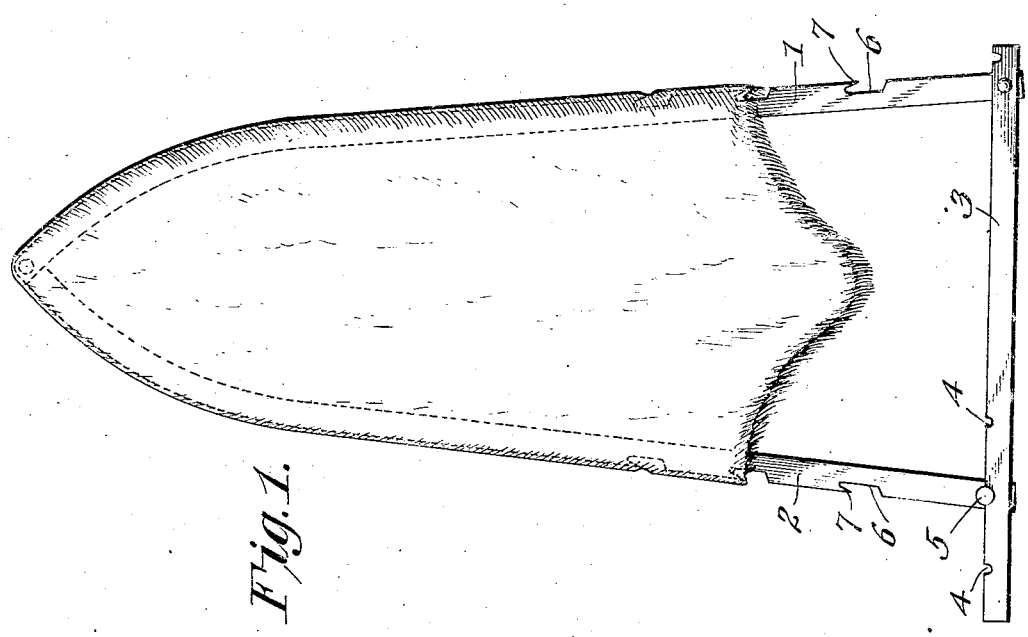

UNITED STATES PATENT OFFICE.

ABRAHAM HIRSCH, OF ALBERT LEA, MINNESOTA.

UNIVERSAL PELT-STRETCHER.

No. 823,170.

Specification of Letters Patent.

Patented June 12, 1906.

Application filed February 27, 1906. Serial No. 303,286.

*To all whom it may concern:*

Be it known that I, ABRAHAM HIRSCH, a citizen of the United States, residing at Albert Lea, in the county of Freeborn and State of Minnesota, have invented certain new and useful Improvements in Universal Pelt-Stretchers; and I do hereby declare the following to be a full, clear, and exact description of the invention, such as will enable others skilled in the art to which it appertains to make and use the same.

My invention relates to fur-stretchers, and more particularly to that class of stretchers adapted to be used in connection with the pelts of small animals.

The object of my invention is to so construct the device that it can be adjusted to stretch different-sized pelts.

A further object is to provide means on the stretcher to hold the hide in position thereon without cutting or mutilating the pelt.

Other objects and advantages will be hereinafter clearly described in the specification and pointed out in the claims, reference being had to the accompanying drawings, which are made a part of this application, and in which—

Figure 1 is a plan view of my improved stretcher, showing a pelt in position thereon; and Fig. 2 is a detail perspecive view of the lower end of one member of the stretcher.

Referring to the figures by numerals of reference, 1 and 2 are stretching-arms, the upper ends of which are inwardly curved and pivotally secured together. To the lower end of the arm 1 is pivotally secured a spacing-bar 3, said bar having upon one of its edges a series of notches 4, into which is adapted to alternately take a locking-bolt 5, said locking-bolt being rigidly secured to the lower end of the stretching-arm 2. The outer edges of the stretching-arms 1 and 2 are provided with a series of notches 6, the upper ends of said notches being provided with depending contact-points 7.

In operation the arm 2 is moved inwardly toward the arm 1 until said arms are in juxtaposition to each other, when they are inserted within the pelt to be stretched, and when said arms have been inserted into the pelt the proper distance the arm 2 is moved away from the arm 1 until the pelt is stretched to the proper degree, when the spacing-bar 3 is brought into engagement with the locking-bolt 5 and said bolt seated in one of the notches 4. When the arm 2 is moved outwardly from the arm 1, that portion of the pelt immediately over the notches in said arms will enter said notches and engage the contact-points 7, thus securely retaining the pelt upon said arms until the same is thoroughly dried or it is desired to remove the same.

By this construction it will readily be seen that the pelt will be securely held in position upon the stretcher and that said pelt can be readily and quickly removed when desired by releasing the locking-bolt 5 from the notch in the bar 3 and moving the arms 1 and 2 toward each other.

What I claim is—

1. A pelt-stretcher of the class described comprising stretching-arms pivotally secured together at their upper ends, a spacing-bar pivoted to one of said arms, said bar having notches upon one of its edges, a locking-bolt carried by the opposite arm adapted to engage said notches, said arms having a plurality of notches in their outer edges, and a contact-point at the upper end of each notch longitudinally disposed with said arms and adapted to engage a pelt stretched over said arms.

2. The herein-described pelt-stretcher comprising arms pivotally secured together at one end, each of said arms having a series of notches in their outer edges, a contact-point at the upper end of each of said notches and parallel with said arms, and means at the lower end of said arms adapted to space said arms apart when desired.

3. A pelt-stretcher comprising a pair of arms pivotally secured together at one end, means at the other ends of said arms to space and lock them apart when desired, each of said arms having notches in their outer edges and downwardly-projecting contact-points at the upper end of each of said notches adapted to engage a pelt and hold the same upon said arms, said points extending in a direction longitudinal with said arms.

In testimony whereof I have signed my name to this specification in the presence of two subscribing witnesses.

ABRAHAM HIRSCH.

Witnesses:
JOHN F. D. MEIGHEN,
SOPHYE ANDERSON.